US008803896B2

(12) United States Patent
Swingler

(10) Patent No.: US 8,803,896 B2
(45) Date of Patent: Aug. 12, 2014

(54) PROVIDING A COHERENT USER INTERFACE ACROSS MULTIPLE OUTPUT DEVICES

(75) Inventor: Michael A. Swingler, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 644 days.

(21) Appl. No.: 12/214,327

(22) Filed: Jun. 17, 2008

(65) Prior Publication Data

US 2009/0309808 A1    Dec. 17, 2009

(51) Int. Cl.
| | |
|---|---|
| *G06F 13/00* | (2006.01) |
| *G06F 3/14* | (2006.01) |
| *G09G 5/00* | (2006.01) |
| *G09G 5/39* | (2006.01) |
| *G09G 5/393* | (2006.01) |
| *G09G 5/399* | (2006.01) |
| *G09G 5/14* | (2006.01) |
| *G09G 5/36* | (2006.01) |

(52) U.S. Cl.
USPC ............................................ 345/536; 345/1.1

(58) Field of Classification Search
None
See application file for complete search history.

(56) References Cited

U.S. PATENT DOCUMENTS

| | | | |
|---|---|---|---|
| 6,232,932 B1 | 5/2001 | Thorner | |
| 6,573,913 B1 * | 6/2003 | Butler et al. | 715/761 |
| 7,302,648 B1 | 11/2007 | Brunner et al. | |
| 7,307,641 B2 | 12/2007 | Dowdy | |
| 2005/0213833 A1 * | 9/2005 | Okada et al. | 382/240 |
| 2006/0050090 A1 * | 3/2006 | Ahmed et al. | 345/660 |
| 2006/0127059 A1 | 6/2006 | Fanning | |
| 2008/0030425 A1 * | 2/2008 | Fullerton et al. | 345/1.1 |

* cited by examiner

*Primary Examiner* — Xiao Wu
*Assistant Examiner* — Matthew D Salvucci
(74) *Attorney, Agent, or Firm* — Blakely, Sokoloff, Taylor & Zafman LLP

(57) ABSTRACT

Exemplary embodiments of methods and apparatuses to provide a coherent user interface across output devices having various characteristics are described. Rendering into a first window back buffer is performed to output a window on a first output device having first characteristics, and rendering into a second window back buffer is performed to display the window on a second output device having second characteristics. Pixel values of the window outputted on the first output device are stored in the first window back buffer, and the pixel values of the window outputted on the second output device are stored in the second window back buffer. The size of the first window back buffer is associated with the first characteristics of the first output device, and the size of the second window back buffer is associated with the second characteristics of the second output device.

33 Claims, 11 Drawing Sheets

PROVIDING A COHERENT USER INTERFACE ACROSS MULTIPLE OUTPUT DEVICES

FIELD

At least some embodiments of the present invention relate generally to graphical user interfaces, and more particularly to buffered window systems.

BACKGROUND

In buffered window systems, application programs do not draw directly into a video memory, but to off-screen window buffers in system memory that are then composed together by the buffered window system to render the final screen, typically a number of times per second. That is, instead of outputting directly to a common screen, application programs each output data first to a separate and independent window buffer, where the data can be manipulated before they are transferred to a frame buffer to be shown on a screen of a display device. The output from these separate window buffers is then processed and combined in the frame buffer to display onto a common screen of the display device.

FIG. 1 illustrates a typical buffered window system. In a buffered window system, applications draw content in the window buffers; and the window system combines the images buffered in window buffers in a frame buffer to display the corresponding windows on the screen. For example, application software 101 draws content in window buffer 115, which is typically allocated from system memory 111. When the size of the window displayed on the display is changed, a new window buffer is typically allocated that replaces the old one in order to accommodate the window of the new size. Frame buffer 121 contains data for the screen image of the windows that are displayed on the screen of display device 105. When the window for application software 101 is moved on the screen, the content in the window is not changed; and the application software does not have to update window buffer 115. The window system copies the data in the window buffer to the correct position in frame buffer 121 to display the window in the new location on the screen. When the window is partially covered by other windows, a portion of data in window buffer 115 is copied onto the frame buffer to display the corresponding portion of the window that is visible. Frame buffer 121 is typically under control of graphics hardware 103 (e.g., graphics/video card) which controls the display of the windows on the screen of display device 105 using the data in the frame buffer. Thus, in a buffered window system, operations for creating the content in windows are separated from operations for composing a screen image from images of windows for different applications. Applications create (or update) images of the windows (content for the windows) in window buffers; and the window system composes a screen image from images of the windows in the window buffers. The window buffers are independent from the frame buffer. Content in the corresponding window buffers can be copied by the window system to the corresponding locations in the frame buffer to display the windows in these locations on the common screen of the display device. The window back buffers are independent from the frame buffer.

The window may be displayed concurrently on multiple displays attached to a computer system. For example, the window displayed on a high resolution notebook display may be mirrored onto a low resolution projector display. In another example, one portion of the window may be displayed on a high resolution display, and other portion of the window may be displayed on a low resolution display. An application program typically renders into a single window back buffer to display the content of the same window on multiple displays. If these displays have different resolutions, the single window back buffer is typically rendered at the resolution of the display having the lowest resolution. In such case, the displays having higher resolution are forced to "scale down" and down shift to the resolution of the lowest resolution display. That is, the displays operate in a "blurry" mode instead of using their native resolution. As a result, the image on the displays having higher resolution appears blurred and fuzzy. Alternatively, the low resolution display may be "up-sampled" to the high resolution display. Typically, the image on the "up-sampled" display appears even more fuzzy than on the "scaled down" display.

The prior art includes the following references: U.S. Pat. No. 6,232,932; U.S. Pat. No. 7,307,641; U.S. Pat. No. 7,302,648; and U.S. Patent Application Publication No. 2006/0127059.

SUMMARY

Exemplary embodiments of methods and apparatuses to provide a coherent crisp user interface across output devices having various characteristics are described. Rendering into a first window back buffer is performed to output a window on a first output device having first characteristics, and rendering into a second window back buffer is performed to output the window on a second output device having second characteristics. Rendering into the first window back buffer at the first characteristics and rendering into the second window back buffer at the second characteristics may be synchronized. Rendering into the first window back buffer and into the second window back buffer may be performed to output a first portion of the window on the first output device and to output a second portion of the window on the second output device.

The first window back buffer may be allocated according to the first characteristics of the first output device, and the second window back buffer may be allocated according to the second characteristics of the output device. Values of pixels representing a content of the window on the first output device are stored in the first window back buffer, and the values of the pixels representing the content of the window on the second output device are stored in the second window back buffer. The size of the first window back buffer may be associated with the first characteristics of the first output device, and the size of the second window back buffer may be associated with the second characteristics of the second output device.

In an exemplary embodiment, pixels representing a content of the window outputted on the first output device are scaled to create a scaled version of the pixels. A third window back buffer may be allocated to store values of the scaled version of the pixels. The third window back buffer may be allocated in response to an event. In an exemplary embodiment, a scaling factor is determined based on the characteristics of the first output device. The third window back buffer can be, in certain embodiments, created in response to the event before creating the second window back buffer and in so doing the third window back buffer can act as a fallback buffer in case the second window back buffer cannot be created quickly enough.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
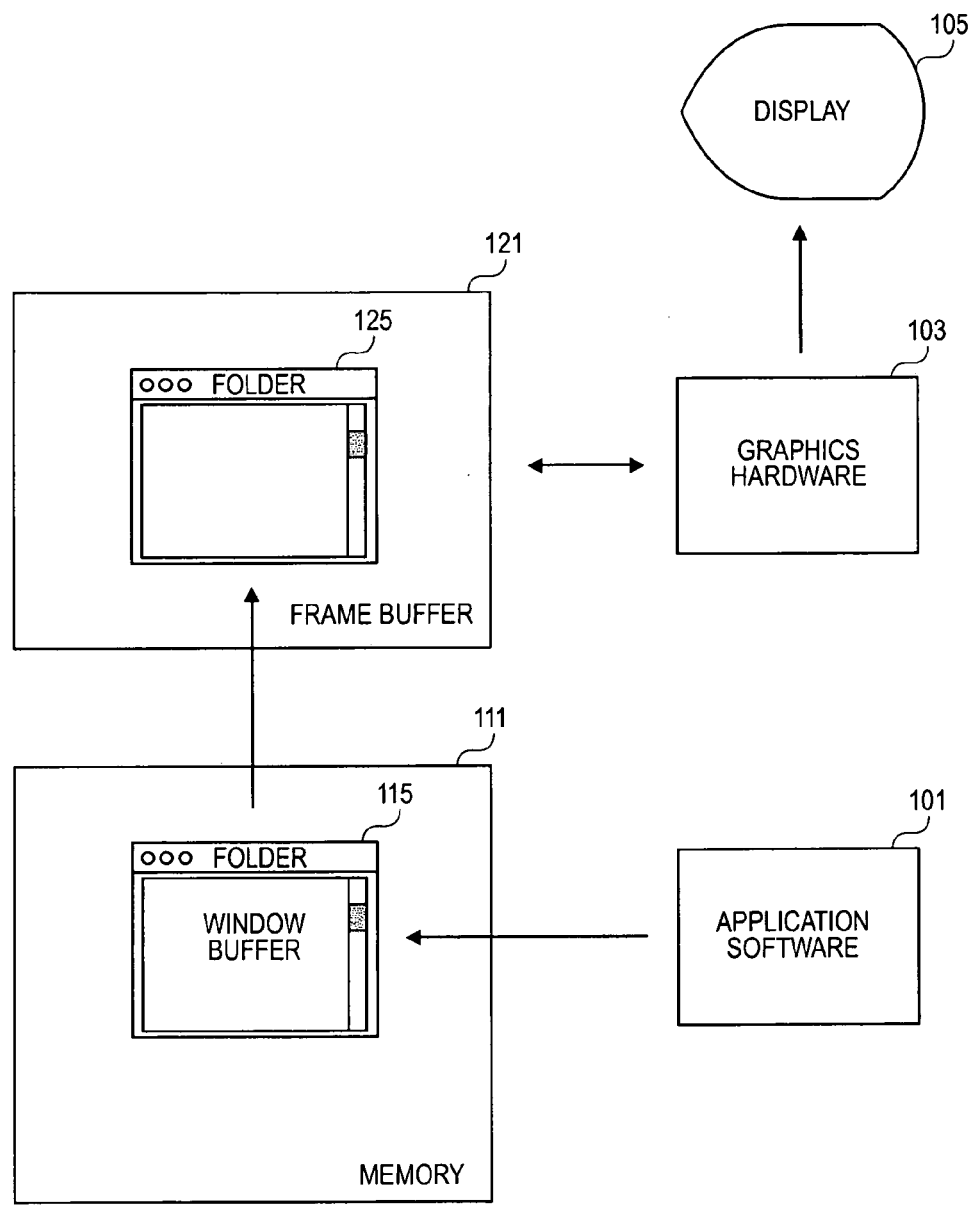
FIG. 1 illustrates a typical buffered window system.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g., computer) readable storage medium, such as, but is not limited to, any type of disk, including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below.

In addition, embodiments of the present invention are not described with reference to any particular programming language. It will be appreciated that a variety of programming languages may be used to implement the teachings of embodiments of the invention as described herein.

Figure 2:
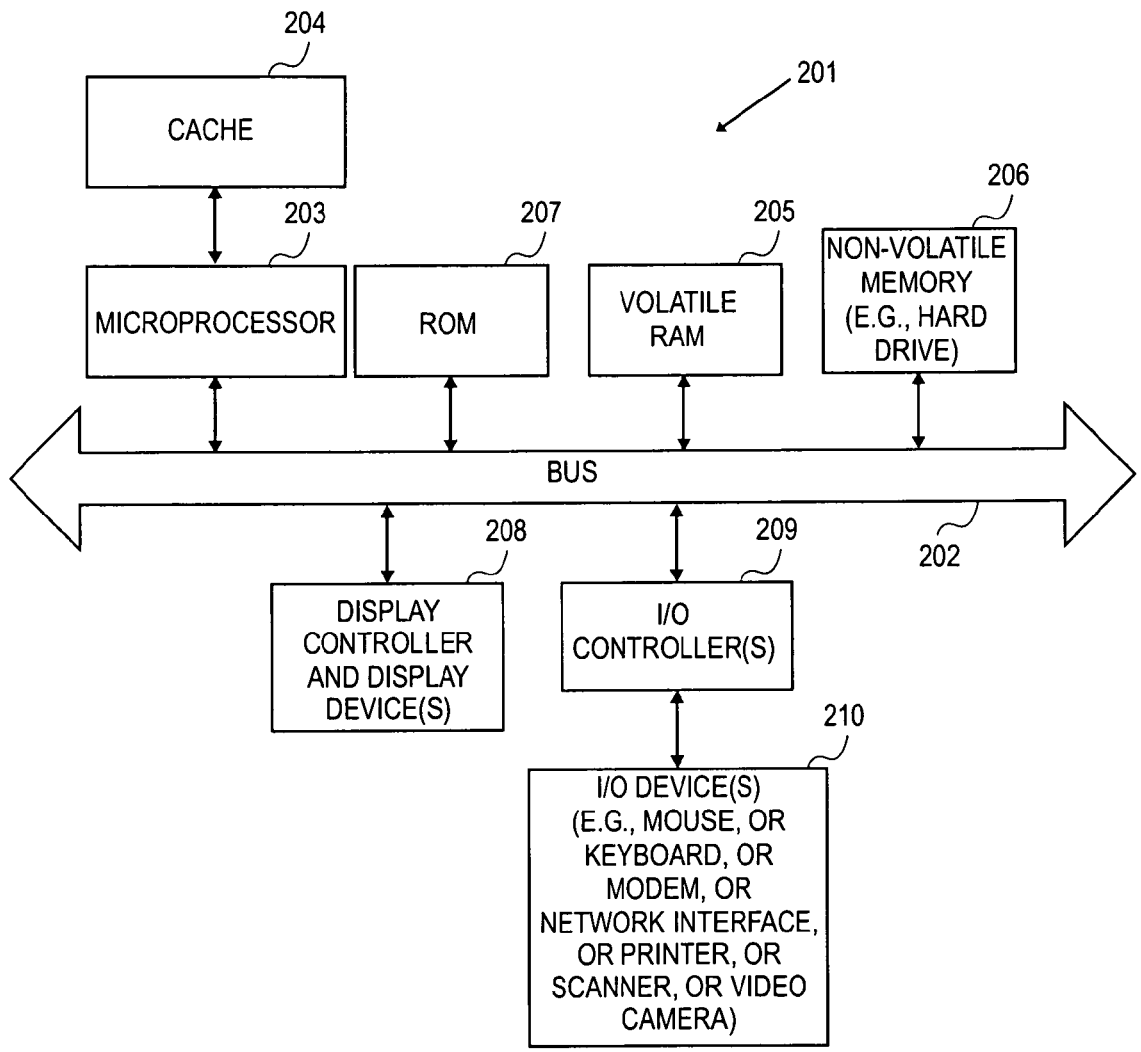
FIG. 2 shows one example of a typical computer system which may be used with the present invention.

FIG. 2 shows one example of a typical computer system which may be used with the present invention. Note that while FIG. 2 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 2 may, for example, be an Apple Macintosh® computer.

As shown in FIG. 2, the computer system 201, which is a form of a data processing system, includes a bus 202 which is coupled to a microprocessor 203 and a ROM 207 and volatile RAM 205 and a non-volatile memory 206. The microprocessor 203, which may be, for example, a G3 or G4 microprocessor from Motorola, Inc. or IBM is coupled to cache memory 204 as shown in the example of FIG. 2. The bus 202 interconnects these various components together and also interconnects these components 203, 207, 205, and 206 to a display controller and display device(s) 208 and to peripheral devices such as input/output (I/O) devices which may be mice, keyboards, modems, network interfaces, printers, scanners, video cameras and other devices which are well known in the art. Typically, the input/output devices 210 are coupled to the system through input/output controllers 209. The volatile RAM 205 is typically implemented as dynamic RAM (DRAM) which requires power continually in order to refresh or maintain the data in the memory. The non-volatile memory 206 is typically a magnetic hard drive or a magnetic optical drive or an optical drive or a DVD RAM or other type of memory systems which maintain data even after power is removed from the system. Typically, the non-volatile memory will also be a random access memory although this is not required.

While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers and/or adapters as is well known in the art. In one embodiment the I/O controller 209 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 207, volatile RAM 205, non-volatile memory 206, cache 204 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 203, or microcontroller.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 2. Portions of this software and/or data may be stored in any one of these storage devices.

Thus, a machine readable medium includes any mechanism that provides (i.e., stores and/or transmits) information in a form accessible by a machine (e.g., a computer, network device, cellular phone, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The methods of the present invention can be implemented using dedicated hardware (e.g., using Field Programmable Gate Arrays, or Application Specific Integrated Circuit) or shared circuitry (e.g., microprocessors or microcontrollers under control of program instructions stored in a machine readable medium. The methods of the present invention can also be implemented as computer instructions for execution on a data processing system, such as system 100 of FIG. 2.

Many of the methods of the present invention may be performed with a digital processing system, such as a conventional, general-purpose computer system. The computer systems may be, for example, entry-level Mac Mini™ and consumer-level iMac™ desktop models, the workstation-level Mac Pro™ tower, and the MacBook™ and MacBook Pro™ laptop computers produced by Apple Inc., located in Cupertino, Calif. Small systems (e.g. very thin laptop computers) can benefit from the methods described herein. Special purpose computers, which are designed or programmed to perform only one function, or consumer electronic devices, such as a cellular telephone, may also perform the methods described herein.

Figure 3:
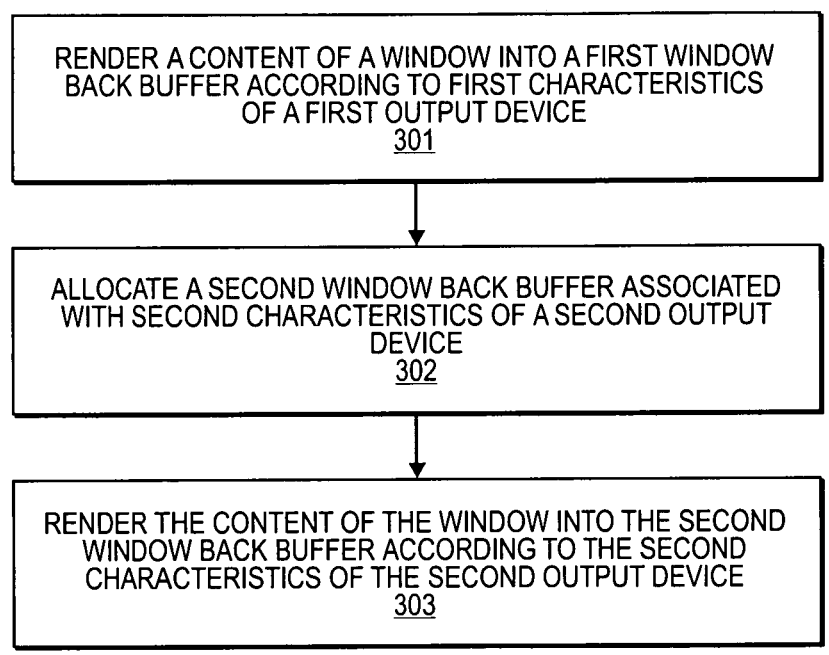
FIG. 3 is a flowchart of one embodiment of a method 300 to provide a coherent user interface across multiple output devices.

FIG. 3 is a flowchart of one embodiment of a method 300 to provide a coherent user interface across multiple output devices. Method 300 begins with operation 301 that includes rendering a content of a window into a first window back buffer according to first characteristics of a first output device.

The output device may be a display, printer, camera, and any other device to output the content of the window. Rendering into the first window back buffer may be performed to output the window on the first output device having first characteristics. The characteristics of the output device may be resolution, video standard, data depth, color depth, palette size, and other characteristics.

Typically, dots per inch (DPI) and pixels per inch (PPI) are used as measures of printing or display resolution. DPI (or PPI) is referred to the number of individual dots (or pixels) that can be produced within a linear one-inch (2.54 cm) space. PPI may also be used to describe the resolution of an image scanner or digital camera; in this context, it is synonymous with the number of individual samples that are taken in the space of one linear inch (samples per inch).

At operation 302, a second window back buffer associated with second characteristics of a second output device is allocated. At operation 303 the content of the same window is rendered into a second window back buffer according to the second characteristics of the second output device. Rendering into the second window back buffer may be performed to output the window on the second output device having second characteristics. For example, the content of the window can be rendered into a first window back buffer at a first resolution of a first output device, and into a second window back buffer at a second resolution of a second output device. Thus, for each N output devices that have N different characteristics the data processing system generates N window back buffers per window. That is, multiple backing buffers having different size may be created to store the data representing the same window contents at different characteristics. This allows each output device to render at the maximum possible capability (e.g., resolution, video standard, color depth, etc.) while maintaining seamless user interface, fidelity, and size of the window. In one embodiment, the data processing system uses a single computer core to render to multiple output devices. In another embodiment, the data processing system uses multiple computer cores that operate simultaneously to render to multiple output devices. In one embodiment, the operating system re-renders the window content into multiple buffers for the best resolution of each of the output devices of the computer system. In another embodiment, an application and/or an application framework (e.g., AppKit) re-renders the window content into multiple buffers for the best resolution of each of the output devices of the computer system, as described in further detail below.

In one embodiment, rendering into the first window back buffer and rendering into the second window back buffer are synchronized. In one embodiment, rendering into the first window back buffer and rendering into the second window back buffer is performed at the same time, simultaneously. In one embodiment, rendering into the first window back buffer and rendering into the second window back buffer is performed in response to turning ON the mirroring of the output devices. It should be borne in mind that, depending on an embodiment, operations 301-303 may be performed in any order. In one embodiment, operations 301-303 are performed sequentially. In another embodiment, operations 301 and 303 are performed in parallel. In yet another embodiment, some of operations 301-303 are performed sequentially, and some of operations 301-303 are performed in parallel. In one embodiment, values of the pixels representing the window outputted onto the first output device are stored in the window back buffer associated with the first characteristics; and values of the pixels representing the window outputted onto the second output device are stored in the second window back buffer associated with the second characteristics.

That is, multiple window back buffers are instantiated and rendered into to output a window on multiple output devices having different characteristics. The number of window back buffers can be reduced if the window is output only onto one output device, e.g., onto one display. The window back buffer can be dynamically generated again ("re-inflated back"), for example, in response to an event. The event may be a user and/or data processing system initiated window motion (e.g., drag and/or move of the window; window resizing, scaling, reconfiguration, and/or rotation), optionally with a threshold, as described in further detail below. The event may be connecting to a new output device (e.g., directly and/or via a remote desktop), screen sharing, user switching, or any combination thereof. Switching to another user may both allocate new buffers for one or more windows of the new user interface, and de-allocate buffers for one or more window of the old user interface that is disconnecting from the display. It should be borne in mind that the number of events that may trigger these allocations and/or deallocations are not limited to the listed events, and may not even be "input" events. In at least some embodiments, an application can spontaneously perform an animation to scale a component, and/or move a portion of a window from one display onto another display.

When an application and/or user release the window, the window back buffer can be reclaimed by the data processing system to relieve memory pressure in the application and window server. In one embodiment, window back buffers of the prior user may be released in response to switching from one user to another user.

Figure 4:
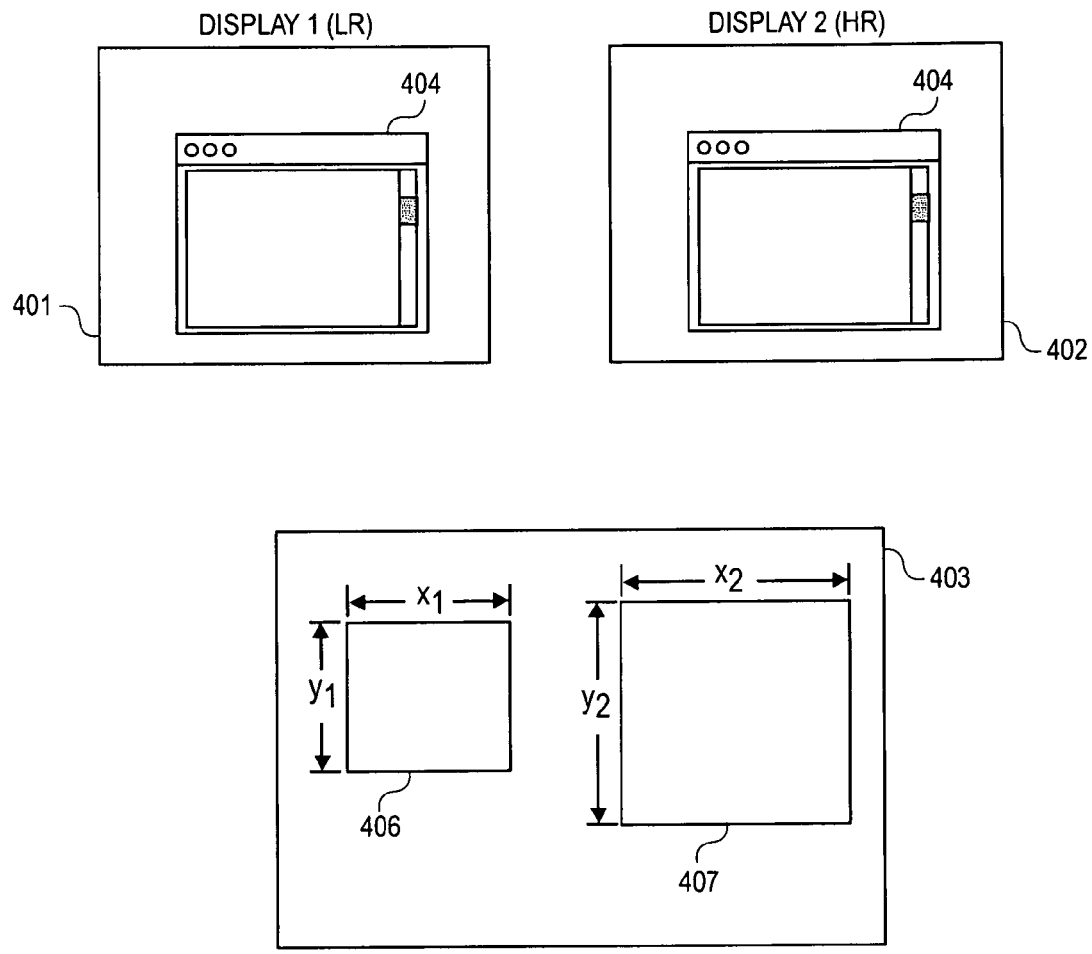
FIG. 4 shows one embodiment of a system to provide a coherent user interface across multiple displays having different characteristics.

FIG. 4 shows one embodiment of a system to provide a coherent user interface across multiple displays having different characteristics. As show in FIG. 4, the resolution of a display 1 401 (LR) is lower than the resolution of a display 2 402 (HR). For example, the resolution of display 401 may be 72 dpi, and the resolution of display 402 may be 144 dpi. For example, display 401 may contain 600 pixels×800 pixels, and display 402 may contain 1200 pixels×1600 pixels. For example, display 401 may be a projector display having a limited resolution, e.g., 1024 pixels×768 pixels, and display 402 may be a HiDPI notebook display.

Display 401 and display 402, depending from an embodiment, may have the same physical size, or different physical size. As shown in FIG. 4, a content of a window 404 displayed on display 402 is mirrored onto display 401. Generally, mirroring of the window means displaying the same content of the window to look the same on displays.

As shown in FIG. 4, a window back buffer 406 is allocated in memory 403 according to the characteristics of display 401, and a window back buffer 407 is allocated in memory 403 according to the characteristics of display 402.

Window back buffers 406 and 407 are independent of each other. Memory 403 may be a system memory 403, e.g., a volatile RAM 205, as shown in FIG. 2. The pixel values representing the content of the window 404 on display 401 are stored in window buffer 406, and the pixel values representing the content of the window 404 on display 402 are stored in window back buffer 407. In one embodiment, the window back buffer 406 has the size associated with the characteristics of display 401 and the window back buffer 407 has the size associated with the characteristics of the display 402.

As shown in FIG. 4, the ($x_2$, $y_2$) geometry size of window buffer 407 that corresponds to a number of pixels associated with the resolution of display 402 is greater than the ($x_1$, $y_1$) geometry size of window buffer 406 that corresponds to the number of pixels associated with the resolution of display 401. For example, window back buffer 407 for the higher resolution display 402 may store twice more pixels than window back 406 for low resolution display 406. Accordingly, the ($x_2$, $y_2$) geometry size of window back buffer 407 may be twice greater than the ($x_1$, $y_1$) geometry size of window back buffer 406.

Accordingly, the image of the window on display 401 is coherent with the image of the window on display 402 across displays 401 and 402 having different characteristics. For example, the window back buffer 406 may be rendered at resolution 72 dpi, but the higher resolution display 402 does not need to downshift into a "blurry" mode, and is rendered at its native (high) resolution (e.g., 144 dpi). Thus, it is possible to downshift the logical resolution of display 401 (e.g., below 72 dpi), and still render crisp lines without "scaling down" and blurring a higher resolution image.

Figure 5:
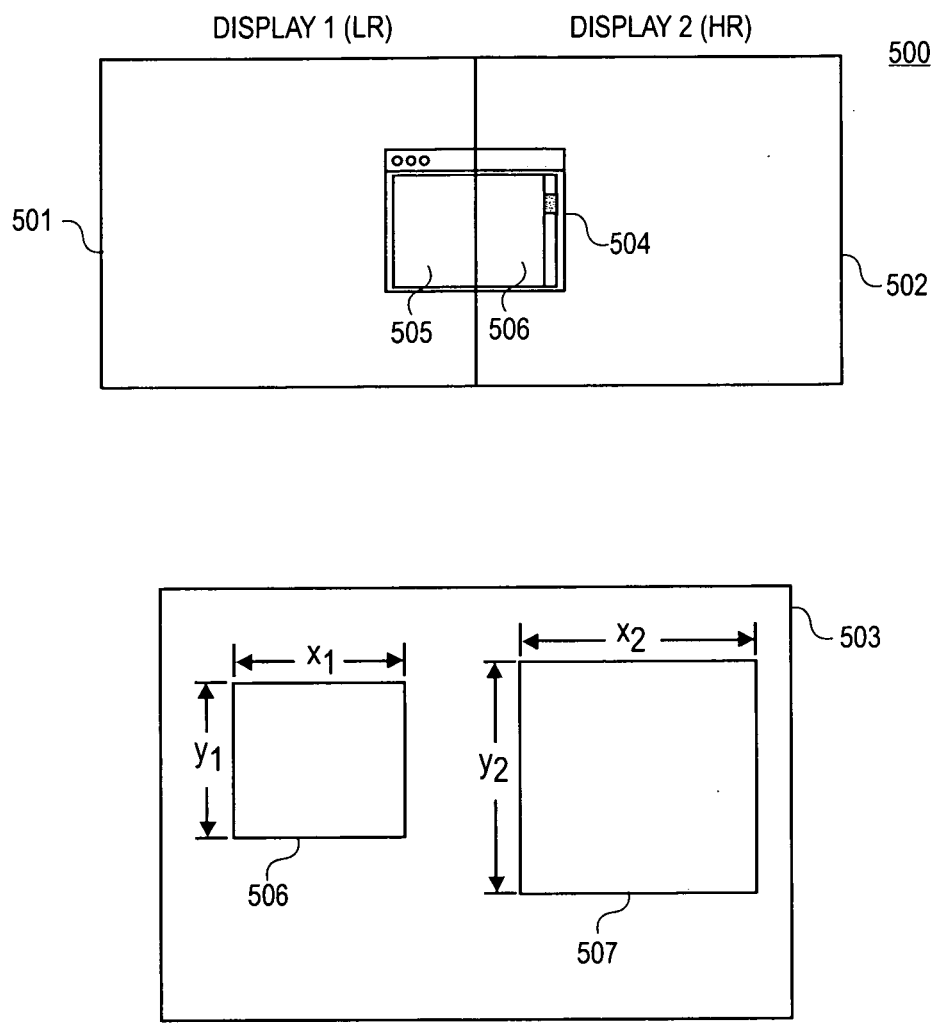
FIG. 5 shows another embodiment of a system to provide a coherent user interface across multiple displays having multiple characteristics.

FIG. 5 shows another embodiment of a system to provide a coherent user interface across multiple displays having multiple characteristics. The resolution of a display 1 501 (LR) is lower than the resolution of a display 502 (HR), as described above. For example, the resolution of display 501 may be 72 dpi, and the resolution of display 502 may be 144 dpi. For example, display 501 may contain 600 pixels×800 pixels, and display 502 may contain 1200 pixels×1600 pixels. As shown in FIG. 5, display 501 is adjacent to display 502. A window 504 is straddled from display 501 to display 502, such that a portion 505 of window 504 is on display 501 and a portion 506 of window 504 is on display 502, as shown in FIG. 5.

A window back buffer 506 is allocated in memory 503 according to the characteristics of display 501, and a window back buffer 507 is allocated in memory 503 according to the characteristics of display 502. Window back buffers 506 and 507 are independent of each other. Memory 503 may be a system memory 503, e.g., a volatile RAM 205, as shown in FIG. 2. The pixel values representing the portion 505 are stored in window buffer 506, and the pixel values representing the portion 506 are stored in window back buffer 507.

In one embodiment, the window back buffer 506 has the size associated with the characteristics of display 501 and the window back buffer 507 has the size associated with the characteristics of the display 502. In one embodiment, the ($x_2$, $y_2$) geometry size of window buffer 507 that corresponds to a number of pixels associated with the resolution of display 502 is greater than the ($x_1$, $y_1$) geometry size of window buffer 506 that corresponds to the number of pixel values associated with the resolution of display 501. For portion 505, rendering into window back buffer 506 is performed at resolution of display 501. For portion 506, rendering into window back buffer 507 is performed at resolution of display 502.

As shown in FIG. 5, the window appears preserving its physical size across displays 501 and 502 while being displayed at different resolutions. For example, portion 505 may have 60 pixels×80 pixels for display 501, and portion 506 may have 120 pixels×160 pixels for display 502.

That is, portions 505 and 506 of the window 504 straddling from display 501 to display 502 are coherent and appear as forming one continuous image of window 504. As such, window back buffer 506 may be rendered at resolution 72 dpi, but the high resolution display 502 does not need to downshift into a "blurry" mode, and is rendered at its native (high) resolution (e.g., 144 dpi). It may be possible to downshift the logical resolution of display 401 (e.g., below 72 dpi), and still render crisp lines without "scaling down" and blurring a higher resolution image.

In one embodiment, when the window is moved completely on one display, one of the window back buffers is released to free up the memory. The second window back buffer can be dynamically generated again ("re-inflated")

when the window, for example, moves, or straddles more than one display, as described in further detail below.

Figure 6:
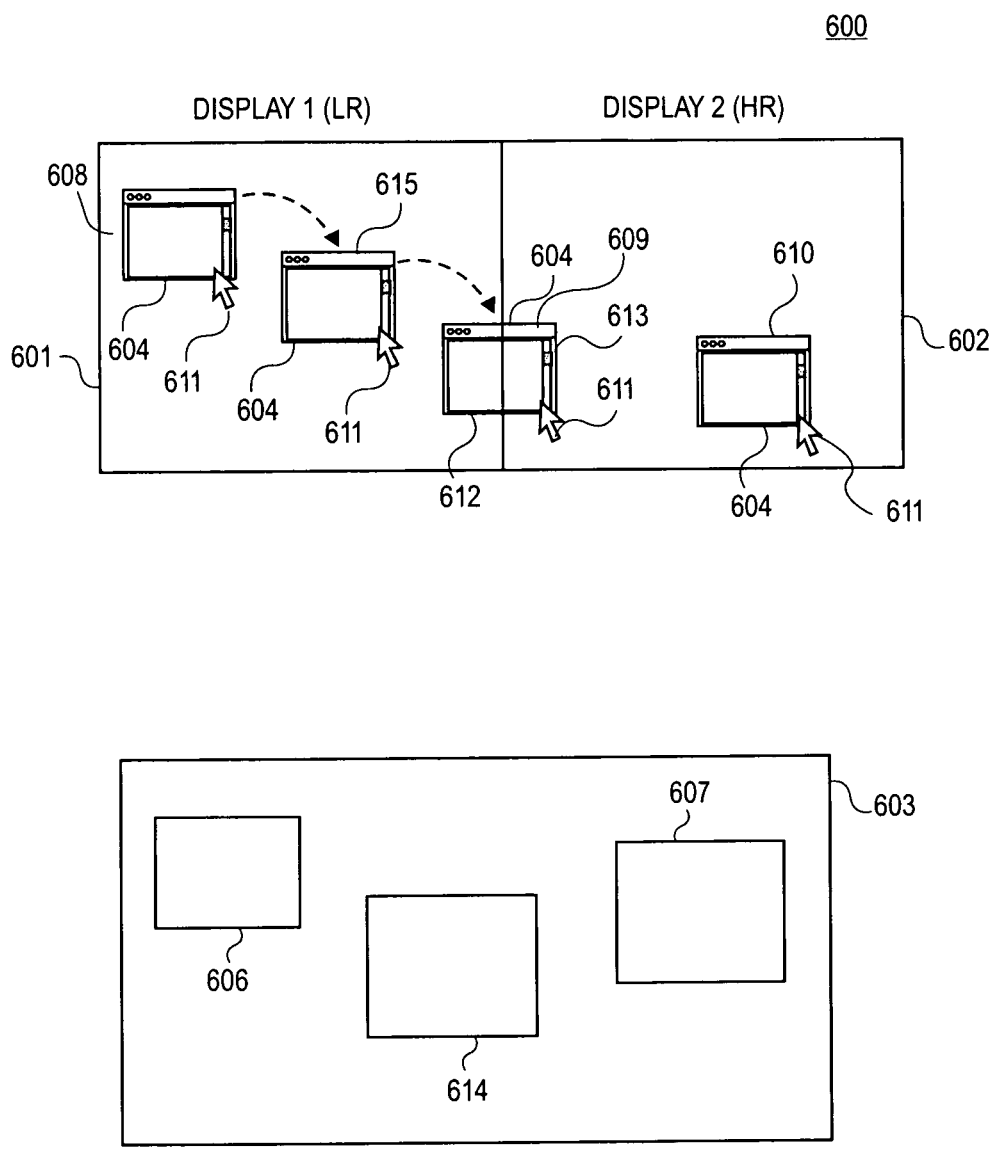
FIG. 6 shows yet another embodiment of a system to provide a coherent user interface across multiple displays having multiple characteristics.

FIG. 6 shows yet another embodiment of a system to provide a coherent user interface across multiple displays having multiple characteristics. The resolution of a display 1 601 (LR) is lower than the resolution of a display 2 602 (HR), as described above. As shown in FIG. 6, a window 604 is displayed on display 601 at position 608. A window back buffer 606 is allocated in memory 603 according to the characteristics of display 601. In one embodiment, window back buffer 606 has the size associated with the characteristics of display 601. Memory 603 may be a system memory 503, e.g., a volatile RAM 205, as shown in FIG. 2.

In one embodiment, the pixels representing the content of the window 604 on display 601 are scaled to provide a scaled version of these pixels. As shown in FIG. 6, window 604 is moved on display 601 to a position 615. The window 604 may be moved by a user with a cursor 611, and/or by the data processing system. A scaled window back buffer 614 may be allocated in memory 603 for the scaled version of these pixels. The scaled window back buffer 614 may be allocated in response to an event. The event may be a user and/or application controlled window motion (e.g., drag and/or move of the window; window resizing, reconfiguration, and/or rotation), optionally with a threshold. For example, a predefined radius (threshold) may be set, such that the scaled window back buffer is allocated, when the window is moved to the predefined radius (threshold) on display. Further, the event may be connecting to a new display (e.g., directly and/or via a remote desktop), resizing the window (initiated either by the user and/or by the data processing system), rotating the window, scaling the window (e.g., accessibility zooming); screen sharing; user switching, or any combination thereof.

The scaled version of the pixels representing the window 604 on display 601 may be stored in window back buffer 614. The window back buffer 614 may have the size of window back buffer 606 multiplied by a scaling factor. The scaling factor may be determined based on the characteristics of the display 601, as described in further detail below. Window back buffer 614 may be allocated in response to an event. In one embodiment, window back buffer 614 is allocated as a temporary fall-back buffer. For example, if window 604 is dragged by a user so quickly that an application program does not have enough time to respond to the drag, the data processing system displays a representation of the window 604 on display 602 using fall back buffer 614. In one embodiment, a window managing system (server) renders into the fall back window buffer 614 to display the window on display 602 while the application is busy, for example, creating new window back buffers according to the characteristics of one or more new displays. Thus, the scaled window backing buffers may be used as a fall back buffer in case an application program does not get a chance to create additional window backing buffers.

Figure 7:
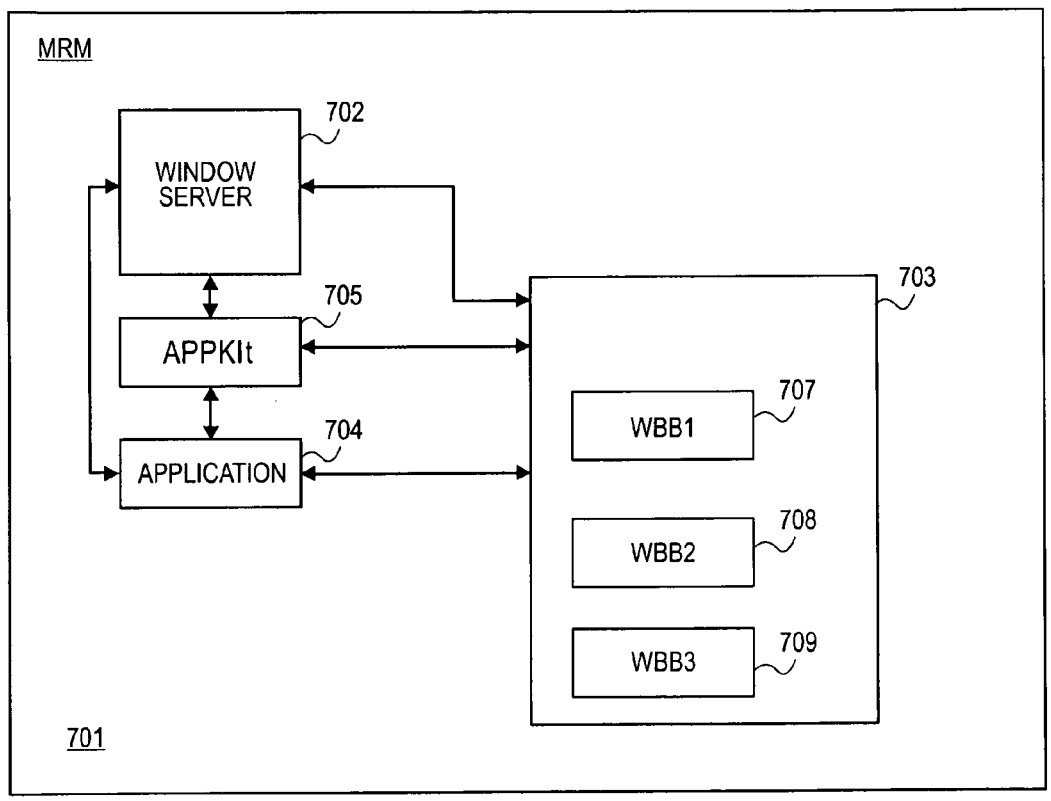
FIG. 7 shows an example of a machine readable media, which may be used to store software and data which when executed by a data processing system causes the system to perform various methods of the present invention.

FIG. 7 shows an example of a machine readable media, which may be used to store software and data which when executed by a data processing system causes the system to perform various methods of the present invention. As noted above, this executable software and data may be stored in various places including for example ROM 207, volatile RAM 205, non-volatile memory 206 and/or cache 204 as shown in FIG. 2. Portions of this software and/or data may be stored in any one of these storage devices. Media 700 for example may be primarily volatile RAM 205 and non-volatile memory 206 in one embodiment. Media 700 includes a window managing system (window server) 702. In one embodiment, window server 702 is a part of an operating system (not shown). Application 704 represents an application program, which output contents in corresponding windows on the system. Window buffers 707-709 contain the values of the pixels for a window content output to at least two output devices having different characteristics. In one embodiment, window back buffer 708 has the geometry associated with the characteristics of a first output device; and window back buffer 709 has the geometry associated with the characteristics of a second output device, as described above, and window back buffer 708 is scaled based on the characteristics of the first output device. Using the methods of various embodiments of the present invention, an application 704, an application framework 705 (e.g., AppKit), and window server 702 communicate with each other to scale a window back buffer, allocate window back buffers, render into the window back buffers, as described in further detail below. Window buffers 707-709 may be allocated in system memory 703, e.g., volatile RAM 205, or on video memory (e.g., in display controller 208 of FIG. 2).

Referring back to FIG. 6, in one embodiment, a window managing system (server) renders into window back buffer 614 until a window back buffer 607 is generated according to the characteristics of display 602. In one embodiment, window back buffer 607 is generated by an application program. In another embodiment, window back buffer 607 is generated by an application framework (e.g., AppKit), as described in further detail below. In one embodiment, window back buffer 607 has the size associated with the characteristics of the display 602.

In one embodiment, after window back buffer 607 is generated, the window back buffer 607 is used to display window 604 on display 602, and fall back window back buffer 614 is released. Window back buffers 606, 614, and 607 are independent from each other. In one embodiment, the $(x_2, y_2)$ geometry size of window buffer 607 that corresponds to a number of pixels associated with the resolution of display 602 is greater than the $(x_1, y_1)$ geometry size of window buffer 606 that corresponds to the number of pixel values associated with the resolution of display 601. For portion 612, rendering into window back buffer 606 is performed at resolution of display 601. For portion 613, rendering into window back buffer 607 is performed at resolution of display 602. As shown in FIG. 6, the window preserves its physical size across displays 601 and 602 while being displayed on displays having different resolution. That is, portions 605 and 606 of the window 604 straddling from display 601 to display 602 are coherent. In one embodiment, the window buffer 607 and window buffer 606 rendering at their maximum resolution have different geometries. In one embodiment, window buffer 607 may tilted relative to window buffer 606 to provide, e.g., a stereo vision. In another embodiment, window back buffers 607 and 606 have different geometries to accommodate respective pixels having different shapes (e.g., squares, triangles, circles, and other shapes). In one embodiment, the geometry of window buffer 606 is associated with a black-and-white display, and the geometry of window buffer 607 is associated with a color display. In various embodiments, the different geometries of the window buffers are associated with different characteristics of printers, displays, and/or any other output devices.

Figure 8A:
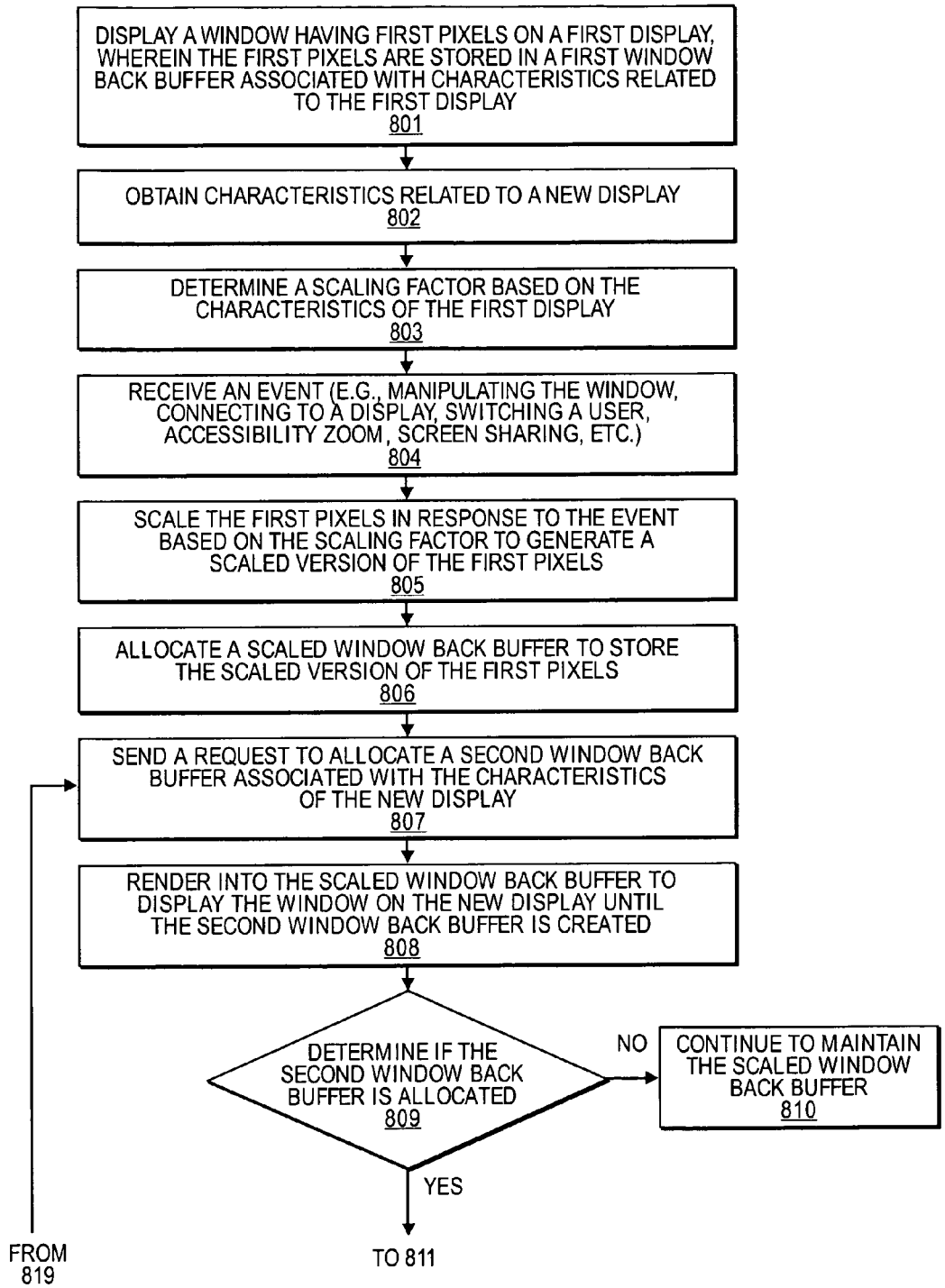
FIGS. 8A and 8B show a flowchart of one embodiment of a method to provide a coherent user interface across multiple displays.
Figure 8B:
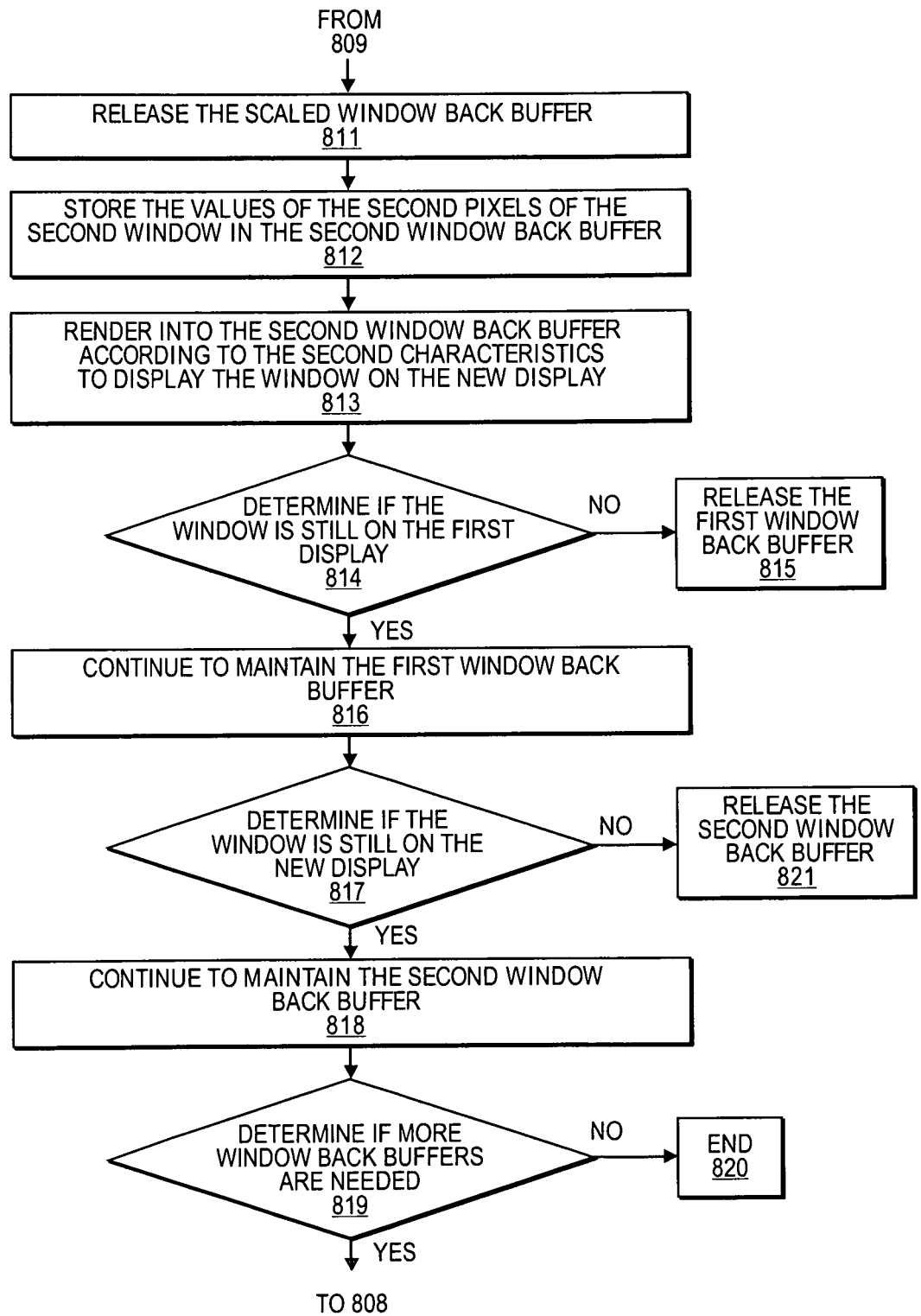

FIGS. 8A and 8B show a flowchart of one embodiment of a method 800 to provide a coherent user interface across multiple displays. At operation 801, a window (e.g., window 604 of FIG. 6) represented by first pixels is displayed on a first display (e.g., display 601). The first pixels of the window are stored in a first window back buffer (e.g. window back buffer 606 of FIG. 6) associated with the characteristics related to the first display. At operation 802 the characteristics related to the first display (e.g., display 601 of FIG. 6) are obtained.

The characteristics of the display may include a resolution of the display, video standard, data/bit depth, color depth, palette size, and other characteristics. At operation 803 a scaling factor is optionally determined based on the characteristics of the first display. In one embodiment, the scaling factor is determined at the time of plugging in the display. In one embodiment, the scaling factor is calculated based on the physical geometry (width X, height Y) and the resolution of the display. For example, when an Input/Output (I/O) frame Kit of the data processing system recognizes that a display has been plugged in, the I/O frame Kit asks for and receives the information from the display, such as the physical size of the display (e.g., in millimeters), resolution, and other characteristics. In another embodiment, if the information from the display is not obtainable, the I/O frame Kit provides the default characteristics to calculate the scaling factor. In one embodiment, a window server (e.g., window server 705 of FIG. 7) calculates the scaling factor. In another embodiment, an application program (e.g., application 704 calculates the scaling factor. In yet another embodiment, the application framework (e.g. framework 705 of FIG. 7) calculates the scaling factor.

At operation 804 an event (e.g., manipulating the window, connecting to a display, switching a user, accessibility zoom, screen sharing, etc) is received. At operation 805 the first pixels representing the window displayed on the first display are scaled in response to the event to generate a scaled version of these pixels. The pixels may be scaled based on the scaling factor. In one embodiment, the pixels may be scaled based on a predetermined scale factor. In another embodiment, a current scaling factor may be dynamically determined for every scaling operation, so that pixels may be scaled based on the current scaling factor.

In one embodiment, a window server (e.g., window server 705 of FIG. 7) scales the pixels representing the window displayed on the first display to generate a scaled version of the pixels. In another embodiment, an application program (e.g., application 704) scales the pixels representing the window displayed on the first display to generate a scaled version of the pixels. In yet another embodiment, the application framework (e.g. framework 705 of FIG. 7) scales the pixels representing the window displayed on the first display to generate a scaled version of the pixels. In one embodiment, scaling of the pixels includes multiplying the pixels of the window on the display by the scaling factor.

At operation 806 a scaled (third) window back buffer is allocated to store values of the scaled version of these pixels. In one embodiment, a window server (e.g., window server 705 of FIG. 7) allocates the scaled window back buffer. In another embodiment, an application program (e.g., application 704) allocates the scaled window back buffer. In yet another embodiment, the application framework (e.g. framework 705 of FIG. 7) allocates the scaled window back buffer.

At operation 807 a request to allocate a second ("new") window back buffer that corresponds to the characteristics of a new display is sent. The request to allocate the new window buffer associated with the characteristics of the new display may be sent in response to an event, e.g., window moving/dragging, connecting to the new display, resizing the window (initiated either by the user and/or by the data processing system), rotating the window, scaling the window (e.g., accessibility zooming); screen sharing; user switching, or any combination thereof. In one embodiment, a request 1004 to create a new window back buffer is sent by a window server (e.g., window server 1001) to an application program e.g., an application 1002, as shown in FIG. 10.

Figure 10:
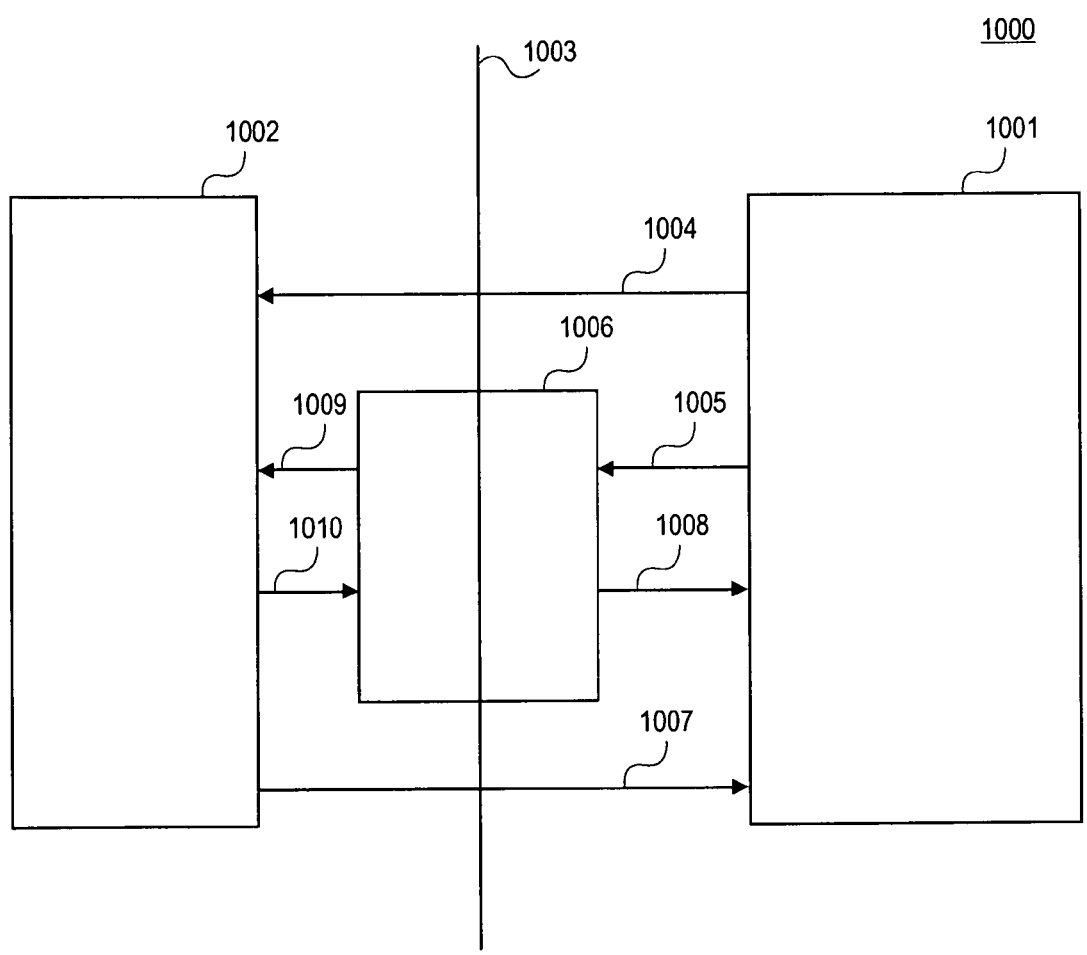
FIG. 10 illustrates one embodiment of communication between a window server and an application program.

FIG. 10 illustrates one embodiment of communication between a window server and an application program. As shown in FIG. 10, a window server 1001 communicates with an application program 1002 through an application program interface (API) 1003.

In another embodiment, a request 1005 to create a new window back buffer is sent by a window managing system (server) to an application framework 1006, e.g., Application Kit (AppKit) that provides a functionality and associated application program interfaces (APIs) for applications, including objects for graphical user interfaces (GUIs), event-handling mechanisms, application services, and drawings and image composition facilities. In one embodiment, the window server, e.g., window server 1001 allocates the new window back buffer and then presents the new window back buffer to the application (e.g., application 1002) and/or App-Kit (1006) for rendering.

The application may have a model of the window content according to a list of criteria (e.g., specification). The model may specify an image of a button, e.g., a style of the button (e.g., metal style), location of the button, size of the button in pixels, e.g., that the button is 200 pixels wide, and 5 pixels tall. AppKit may use the specification provided by the application every time it is asked to render to a window back buffer. For example, AppKit, pulls up the medal art from memory, scales the art, and places the art to a location in the window back buffer based on the data provided by the application. The actual size of the image of the window content (in pixels) depends on the actual resolution of a display.

At operation 808 rendering into the scaled window back buffer is performed to temporarily represent the window on the new display until the new window back buffer associated with the characteristic of the new display is created. At operation 809 a determination is made whether the new window back buffer is allocated. In one embodiment, application program 1002 sends a confirmation 1007 to window server 1001 when the new window buffer has been allocated. In another embodiment, application framework 1006 sends a confirmation 1008 to window server 1001 when the new window buffer has been allocated. In yet another embodiment, application program 1002 sends a confirmation 1010 to application framework 1006 that then transfers the confirmation 1008 to window server 1001 when the new window buffer has been allocated.

If the new window back buffer has not been allocated, the scaled window back buffer is maintained, e.g., by the window server, at operation 810 to display the window on the new display. If the new window back buffer has been allocated e.g., by the application program, application framework (e.g., AppKit), or window server, method 800 continues with operation 811 (FIG. 8B), at which the scaled window back buffer is released, e.g., by the window server, to free up the memory. At operation 812, the values of second pixels representing the window on the new display are stored in the second (new) window back buffer. At operation 813, rendering into the new window back buffer is performed according to the characteristics of the new display to display the window on the new display. At operation 814 a determination is made whether at least a portion of the window is still on the first display. If the window is not on the first display, the first window back buffer is released at operation 815. If at least a portion of the window is on the first display, the first window buffer continues to be maintained at operation 816. At operation 817 a determination is made whether the window is still on the new display. If the window is not on the new display, the second (new) window back buffer is released at operation 821.

If at least a portion of the window is still on the new display, the second window back buffer is continues to be maintained at operation 818. At operation 819 a determination is made whether one or more additional window back buffers are needed. In alternate embodiments, operations 812-820 are performed by the application program, application framework (e.g., AppKit), and/or window server.

In one embodiment, determination that one or more additional window back buffers are needed is made based on receiving an event. For example, the decision that one or more additional window back buffers are needed may be made based on recognizing that one or more new displays are connected, in response to switching into mirroring mode, receiving manipulation of the window, switching to another user, screen sharing, accessibility zoom, and the like.

In another embodiment, the decision that one or more additional window buffers are needed is based on information contained in user preferences that requires rendering into one or more additional window back buffers, which meet characteristics of one or more additional new displays. In one embodiment, the one or more new displays have characteristics that are different from the characteristics of the current display. If the characteristics of one or more new displays are the same as the characteristics of the current display, additional window back buffers may not be needed. In such case, to display a window on multiple displays having the same characteristics rendering may be performed into the current window back buffer. If more window back buffers are needed, method 800 returns to operation 808 (FIG. 8A). If no more window back buffers are needed, method 800 ends at 820.

In one embodiment, each of the multiple window back buffers is treated equally by the window's contents, and each of the window back buffers receives the same drawing commands, the only difference is what happens below the application level where the drawing framework code (e.g., AppKit) can choose different artwork or different line stroke widths depending on the characteristics of the window back buffers associated with the display (e.g., resolution, video standard, color depth, etc). For example, while a line of text may be rendered by the application at "12 point", on one display it will be 14 pixels high, and on another display it will be 17 pixels high-depending on the resolution of the display. The application may not need to know about this. All the application knows is that it is asked to render "several times in a row".

Figure 9:
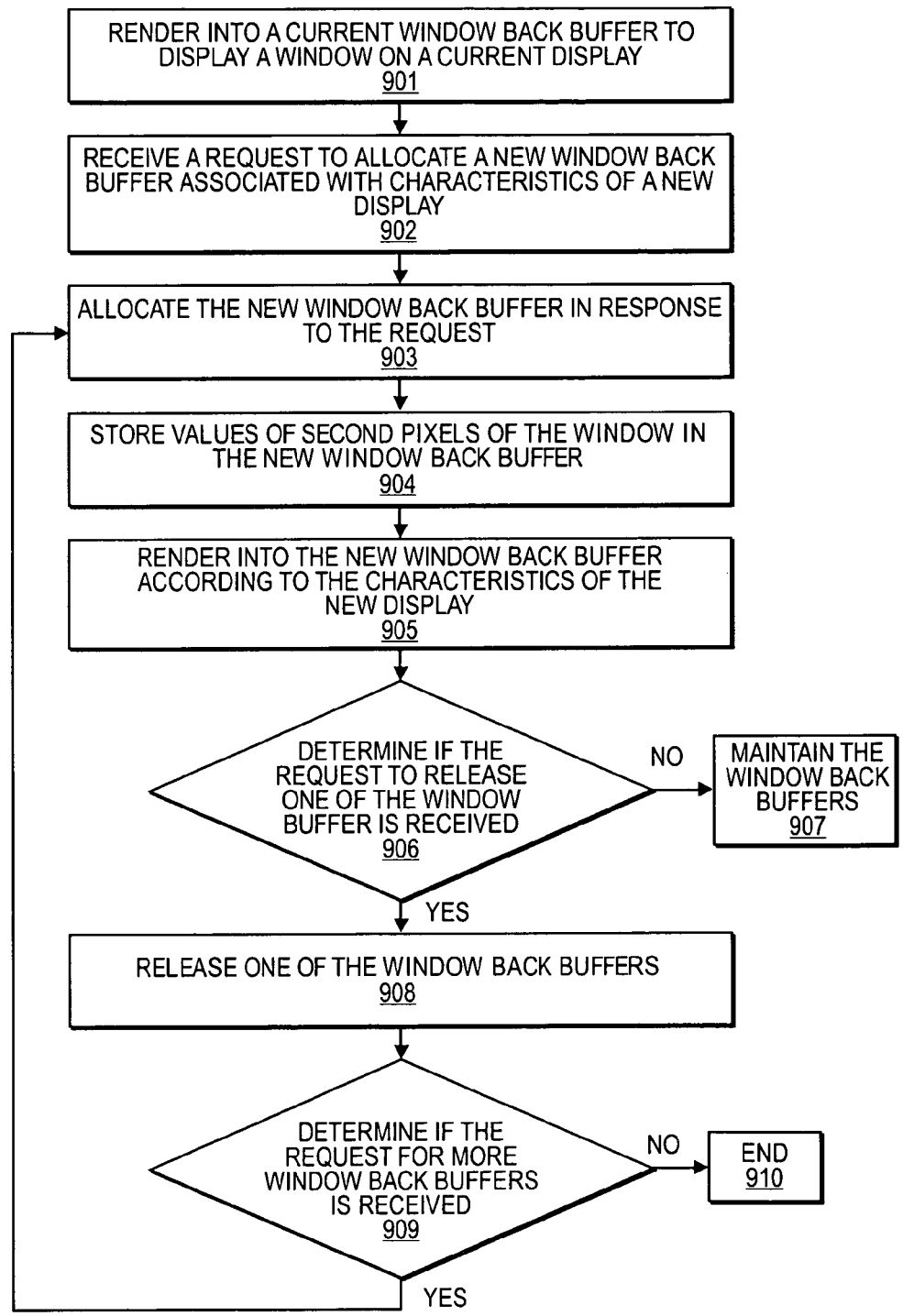
FIG. 9 shows a flowchart of another embodiment of a method to provide a coherent user interface across multiple displays.

FIG. 9 shows a flowchart of another embodiment of a method to provide a coherent user interface across multiple displays. Method 900 begins with operation 901 involving rendering into a current window back buffer to display a window on a current display. In one embodiment, a window server renders into the current window back buffer to display the window on the current display. In another embodiment, an application program renders into the current window back buffer to display the window on the current display. In yet another embodiment, application framework (e.g., AppKit) renders into the current window back buffer to display the window on the current display. At operation 902 a request to allocate a new window back buffer that corresponds to characteristics of a new display is received.

Referring back to FIG. 10, in one embodiment, the request (e.g., request 1004) to allocate a new window back buffer sent by a window server (e.g., window server 1001) is received by an application program (application 1002). In another embodiment, the request (e.g., request 1005) to allocate a new window back buffer sent by a window server (e.g., window server 1001) may be received by the application framework (e.g., application framework 1006) and transferred 1009 from the application framework 1006 to the application 1002 to allocate the new window.

At operation 904 the new window back buffer that corresponds to the characteristics of the new display is allocated in response to the request. For example, the new window back buffer may be allocated based on the resolution of the current display and the new display. For example, if the resolution of the new display is a multiple of the resolution of the current display, the new window back buffer may be allocated that has the size that is a multiple of the size of the current buffer.

In one embodiment, the application program allocates the new window back buffer in response to the request from the window server. In another embodiment, the application framework (e.g., AppKit) creates the new window back buffer in response to the request from the window server. In one embodiment, application framework (e.g., AppKit) allocates the new window back buffer and provides the new window back buffer to the application for rendering the content of the window. Operation 905 involves rendering into the new window back buffer according to the characteristics of the new display. In one embodiment, the application framework (e.g., AppKit) creates the new window back buffer that corresponds to the characteristics of the new display and provides the application program with the scaling factor to draw the content of the window into the new window back buffer. For example, when the application "draws" a line that is 5 points long into the new window back buffer with the scaling factor 2, the line becomes 10 pixels long. The application may be asked to draw the content of the same window a plurality of times to accommodate different resolutions of the displays. In another embodiment, AppKit creates the new window back buffer and renders the content of the window into the new window back buffer with the scaling factor.

At operation 906 it is determined whether the request to release one of the (e.g., current and new) window buffers is received. For example, the request to release one of the window back buffers sent by the window server may be received by the application program, and/or AppKit. If the request to release one of the window back buffers has not been received, all the window back buffers continue to be maintained at operation 907. If the request to release one of the window back buffer has been received, one of the window back buffers (e.g., current or new) is released at operation 908.

At operation 909 a determination is made whether the request for one or more additional window back buffers is received. For example, the request for one or more additional window back buffers sent by the window server may be received by the application program, and/or AppKit. If the request for one or more additional window back buffers is not received, method 900 ends at 910. If the request for one or more additional window back buffers is received, method 900 returns to operation 903. For example, when the window server determines that one or more additional new window buffers are needed that correspond to new characteristics of the one or more new displays, it makes a call to an application process to create the one or more window back buffers that correspond to the new characteristics of the new displays. In alternate embodiments, operations 901-109 are performed by the application program, application framework (e.g., AppKit), and/or window server.

As described above, to fill the multiple window back buffers, the application program and/or AppKit may be asked to re-render the content of the window several times for each logical "repaint" event that occur. All the components and controls may still be laid out in one (e.g., 72 dpi) logical coordinate system, and the window has the same "logical" size while displaying on multiple displays, even though the physical back buffers in memory may have radically different numbers of pixels. This also precludes getting predictable results from the API that queries the application for the window's on-screen contents.

Referring back to FIG. 10, in at least some embodiments, application (e.g., graphics) framework 1006, asks application 1002 to render it's window contents, and record the sequence of graphics operations that happen to a virtual context (not shown). In one embodiment, this sequence of graphics operations can be directed immediately to a real graphics context (not shown), multiplexed (in sequence and/or in parallel) to multiple window back buffers for multiple displays. In at least some embodiments, each sequence of graphics operations is hashed. In one embodiment, the results of the recorded sequence of graphics operation may be stored in a memory, e.g., a cache, and compressed for a future use. In one embodiment, when the identical sequence of the graphics operations needs to be performed, rendering a window's foreground and/or background images, the cache may output optionally compressed results of the recorded sequence of graphics operations instead of re-rendering the whole back buffer again, so that the time and resources of the data processing system are spared.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A machine-implemented method, comprising:
   in response to detecting connection of a second output device having second characteristics that are different from first characteristics of a previously connected first output device, generating a second window back buffer in a memory in addition to a first window back buffer previously generated in the memory to correspond to the first output device;
   in response to detecting that a window is to be rendered on only the first output device, de-allocating the second window back buffer from the memory;
   rendering into the first window back buffer to output the window on the first output device;
   in response to detecting an event associated with the second output device, scaling first pixels for the window as rendered on the first output device to generate a scaled version of the first pixels for the window to be rendered on the second output device, wherein values of the first pixels are stored in the first window back buffer and wherein second pixels comprise the scaled version of the first pixels;
   determining if the second window back buffer has been re-allocated;
   if the second window back buffer has no been re-allocated, allocating, in addition to the first window back buffer, a third window back buffer in the memory to store the values of the second pixels, and rendering into the third window back buffer to output the window on the second display until the second window back buffer has been re-allocated, wherein rendering into the first window back buffer and rendering into the third window back buffer in the memory are performed, at least in part, in parallel;
   re-allocating the second window back buffer in the memory without de-allocating the first window back buffer; and
   rendering into the second window back buffer to output the window on the second output device, wherein rendering into the first window back buffer and rendering into the second window back buffer are performed, at least in part, in parallel.

2. The machine-implemented method of claim 1, wherein the rendering into the first window back buffer and the rendering into the second window back buffer are synchronized.

3. The machine-implemented method of claim 1, further comprising:
   storing first pixel values of the window in the first window back buffer; and
   storing second pixel values of the window in the second window back buffer.

4. The machine-implemented method of claim 1, wherein the event is one of: receiving an input to drag or move a window; receiving an input to resize a window; receiving an input to rotate the window; switching to another user; screen sharing; zooming; switching into a mirroring mode; and any combination thereof.

5. The machine-implemented method of claim 1, wherein the first window back buffer has a first size associated with the first characteristics; and the second window back buffer has a second size associated with the second characteristics.

6. The machine-implemented method of claim 1, further comprising:
   in response to determining the window is to be rendered on only the second output device, de-allocating the first window back buffer.

7. The machine-implemented method of claim 1, wherein the first characteristics include a first display resolution; and the second characteristics include a second display resolution, which is different than the first display resolution.

8. The machine-implemented method of claim 1, wherein the first characteristics include a first video standard and the second characteristics include a second video standard.

9. The machine-implemented method of claim 1, wherein the rendering into the first window back buffer is performed for a first portion of the window outputted on the first output device; and the rendering into the second window back buffer is performed for a second portion of the window outputted on the second output device.

10. The machine-implemented method of claim 1, further comprising:
    determining a scaling factor based on the first characteristics.

11. The machine-implemented method of claim 1, further comprising:
    de-allocating the third window back buffer after the second window back buffer has been re-allocated.

12. A non-transitory machine-readable medium storing executable program instructions which cause a data processing system to perform operations, comprising:
    in response to detecting connection of a second output device having second characteristics that are different from first characteristics of a previously connected first output device, generating a second window back buffer in a memory in addition to a first window back buffer previously generated in the memory to correspond to the first output device;
    in response to detecting that a window is to be rendered on only the first output device, de-allocating the second window back buffer from the memory;

rendering into the first window back buffer to output the window on the first output device;

in response to detecting an event associated with the second output device, scaling first pixels for the window as rendered on the first output device to generate a scaled version of the first pixels for the window to be rendered on the second output device, wherein values of the first pixels are stored in the first window back buffer and wherein second pixels comprise the scaled version of the first pixels;

determining if the second window back buffer has been re-allocated;

if the second window back buffer has not been re-allocated, allocating, in addition to the first window back buffer, a third window back buffer in the memory to store the values of the second pixels, and rendering into the third window back buffer to output the window on the second display until the second window back buffer has been re-allocated, wherein rendering into the first window back buffer and rendering into the third window back buffer in the memory are performed, at least in part, in parallel;

re-allocating a the second window back buffer in addition to the first window back buffer, and rendering into the second window back buffer to output the window on the second output device, wherein rendering into the first window back buffer and rendering into the second window back buffer in the memory are performed, at least in part, in parallel.

13. The machine-readable medium of claim 12, wherein the rendering into the first window back buffer and the rendering into the second window back buffer are synchronized.

14. The machine-readable medium of claim 12, further including instructions that cause the data processing system to perform operations comprising:

storing first pixel values of the window in the first window back buffer; and storing second pixel values of the window in the second window back buffer.

15. The machine-readable medium of claim 12, wherein the event is one of: receiving an input to drag or move a window; receiving an input to resize a window; receiving an input to rotate the window; switching to another user; screen sharing; zooming; switching into a mirroring mode; and any combination thereof.

16. The machine-readable medium of claim 12, wherein the first window back buffer has a first size associated with the first characteristics; and the second window back buffer has a second size is associated with the second characteristics.

17. The machine-readable medium of claim 12, further including instructions that cause the data processing system to perform operations comprising:

in response to determining the window is to be rendered on only the second output device, de-allocating the first window back buffer.

18. The machine-readable medium of claim 12, wherein the first characteristics include a first display resolution; and the second characteristics include a second display resolution, which is different than the first display resolution.

19. The machine-readable medium of claim 12, wherein the first characteristics include a first video standard and the second characteristics include a second video standard.

20. The machine-readable medium of claim 12, wherein the rendering into the first window back buffer is performed for a first portion of the window outputted on the first output device; and the rendering into the second window back buffer is performed for a second portion of the window outputted on the second output device.

21. The machine-readable medium of claim 12, further including instructions that cause the data processing system to perform operations comprising:

determining a scaling factor based on the first characteristics.

22. The machine-readable medium of claim 12, further including instructions that cause the data processing system to perform operations comprising:

de-allocating the third window back buffer after the second window back buffer is re-allocated.

23. A data processing system, comprising:

a processor;

a memory coupled to the processor, wherein the processor is configured to in response to detecting connection of a second output device having second characteristics that are different from first characteristics of a previously connected first output device, generate a second window back buffer in a memory in addition to a first window back buffer previously generated in the memory to correspond to the first output device;

in response to detecting that a window is to be rendered on only the first output device, de-allocate the second window back buffer from the memory;

render into the first window back buffer to output the window on the first output device;

in response to detecting an event associated with the second output device, scale first pixels for the window on the first output device to generate a scaled version of the first pixel, wherein values of the first pixels are stored in the first window back buffer and wherein second pixels comprise the scaled version of the first pixels;

determine if the second window back buffer has been re-allocated;

if the second window back buffer has not been re-allocated, allocate, in addition to the first window back buffer, a third window back buffer in the memory to store the values of the second pixels;

render into the third window back buffer to output the first window on the second output device until the second window back buffer has been re-allocated, wherein rendering into the first window back buffer and rendering into the third window back buffer in the memory are performed, at least in part, in parallel;

re-allocate the second window back buffer in addition to the first window back buffer; and render into the second window back buffer to output the window on the second output device, wherein rendering into the first window back buffer and rendering into the second window back buffer in the memory are performed, at least in part, in parallel.

24. The data processing system of claim 23, wherein the rendering into the first window back buffer and the rendering into the second window back buffer are synchronized.

25. The data processing system of claim 23, wherein the processor is further configured to store first pixel values of the window in the first window back buffer; and store second pixel values of the window in the second window back buffer.

26. The data processing system of claim 23, wherein the event is one of: receiving an input to drag or move a window; receiving an input to resize a window; receiving an input to rotate the window; switching to another user; screen sharing; zooming; switching into a mirroring mode; and any combination thereof.

27. The data processing system of claim 23, wherein the first window back buffer has a first size associated with the first characteristics; and the second window back buffer has a second size associated with the second characteristics.

28. The data processing system of claim 23, wherein the processor is further configured to
   in response to determining the windows is to be rendered on only the second output device, de-allocate the first window back buffer.

29. The data processing system of claim 23, wherein the first characteristics include a first display resolution; and the second characteristics include a second display resolution.

30. The data processing system of claim 23, wherein the first characteristics include a first video standard and the second characteristics include a second video standard.

31. The data processing system of claim 23, wherein the rendering into the first window back buffer is performed for a first portion of the window outputted on the first output device; and the rendering into the second window back buffer is performed for a second portion of the window outputted on the second output device.

32. The data processing system of claim 23, wherein the processor is further configured to determine a scaling factor based on the first characteristics.

33. The data processing system of claim 23, wherein the processor is further configured to de-allocated the third window back buffer after the second window back buffer has been re-allocated.

* * * * *